M. RITTER.
SPEED CHANGING MECHANISM.
APPLICATION FILED JULY 30, 1919.
1,350,670.
Patented Aug. 24, 1920.
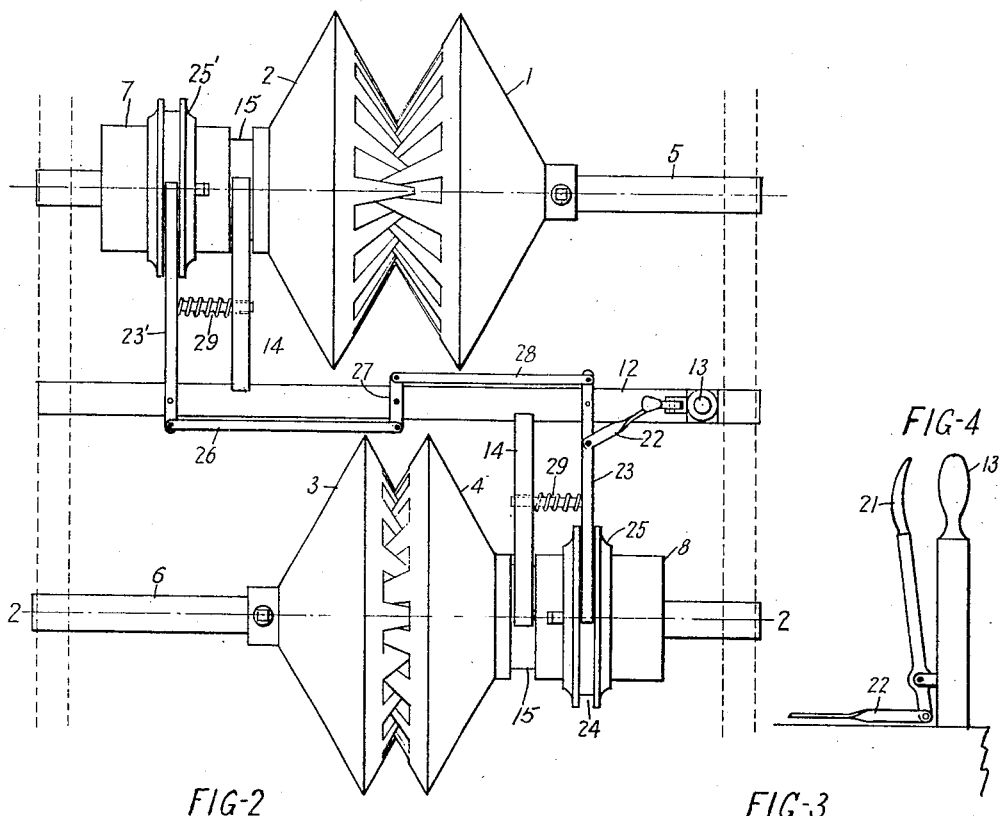
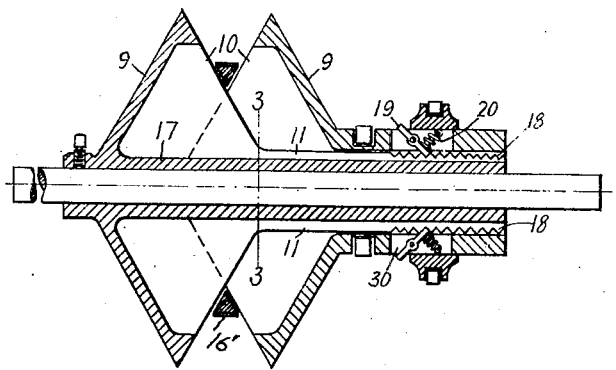
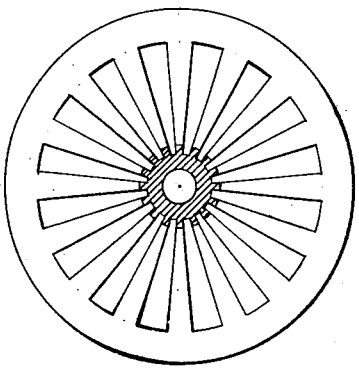
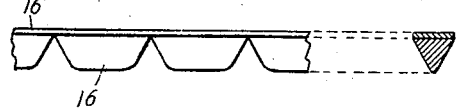
INVENTOR
M. Ritter
BY
J. A. Fowler
ATTORNEY

UNITED STATES PATENT OFFICE.

MATHEW RITTER, OF FREEHOLD, NEW JERSEY.

SPEED-CHANGING MECHANISM.

1,350,670.  Specification of Letters Patent.  Patented Aug. 24, 1920.

Application filed July 30, 1919. Serial No. 314,348.

*To all whom it may concern:*

Be it known that I, MATHEW RITTER, a citizen of Austria, and a resident of Freehold, in the county of Monmouth and State of New Jersey, have invented a certain new and useful Speed-Changing Mechanism, of which the following is a specification, the same being a full, clear, and exact description of the invention, such as will enable others skilled in the art to which it appertains to make and use the same.

This invention relates to differential power transmission devices, and in particular to a simple, novel and effective speed changing means adapted for use for motor vehicles, lathes and other mechanical mechanisms in which it is desired to change the speed of a driven shaft.

In order to attain the desired end, my invention consists in the construction, arrangement and operation of parts hereinafter set forth.

In the drawings, illustrative of one embodiment of the invention, which accompany and form a part of this specification, Figure 1 represents a plan view of a device constructed according to my invention;

Fig. 2 is a view in section taken on the line 2—2 Fig. 1;

Fig. 3 is a section taken on the line 3—3 Fig. 1;

Fig. 4 is a view in detail of the gripping means to unlock and adjust the members of my device; Fig. 5 is a side elevation, and Fig. 6 a section of my belt.

Like numerals of reference indicate like parts in all the views.

Referring particularly to the drawings 1 and 2 denote the members of one of a pair of pulleys, and 3 and 4 the members of the other one of the pair of pulleys, the member 1 being rigidly mounted on the drive shaft 5 and the member 3 being rigidly mounted on the driven shaft 6. The movable member 2 is mounted on a sleeve 7 encircling the shaft 5 and the movable member 4 is likewise mounted on a sleeve 8 encircling the shaft 6.

Each member is preferably made with an outer rigid casing 9 inclosing conical radial ribs or teeth 10 constructed and arranged to be intermeshed or interlocked with each other differentially as the movable members move toward and away from the fixed members as they slide along their respective shafts.

The movable members 2 and 4 are constructed and arranged to approach and recede from the fixed members 1 and 3 according to the distance the sleeves 7 and 8 on which the former are mounted are moved. Guides 11 are provided to aid in holding the ribs or teeth of the members in position under heavy stress or strain.

In order to impart motion to the movable sleeves I provide a bar 12 which may be actuated by a handle 13. From the said bar yokes 14 extend which respectively work in grooves 15 formed in the said sleeves of the members 2 and 4.

On account of the conical formation of the radial ribs or teeth, and of the fact that the movable members lie in opposite sides of the belt 16, it is obvious that upon the movement of the bar 12 in one direction, the movable member 2 of the driving pulley will recede from the rigid member 1 of the same in the exact proportion that the movable member 4 of the driven shaft will approach the rigid member 3, and also that the movable members of the said pulleys will approach and recede from each other in the same proportion when the bar 12 is moved in the opposite direction. In consequence of this construction and arrangement of the parts, the diameter of the center of the pulley 1—2 will diminish in the exact ratio of the increase of the diameter of the center of the pulley 3—4 and vice versa, wherefore the tension of the belt 16 will always remain uniform, no matter what change of speed of the driven pulley may be.

In order that change in the relative positions of the movable members of the pulleys with respect to the fixed members of the same may be readily made, and that the said movable members may be locked in their adjusted positions, I form in the hub 17 of each stationary member of each pulley serrations 18 which are engaged by pawls or dogs 19 which work in slots 30 of the sleeves of the movable members and are held against said serrations by springs 20, which pawls serve to lock the movable members 2 and 4 in their adjusted positions.

As a convenient means of releasing the said pawls, I provide a manually actuated device as a lever 21 which controls a link 22 which serves to move the yoke 23 working in a groove 24 formed in the movable bearing 25 of sleeve 8 of member 4. By pushing the lever 21 against or toward the handle 13, the link 22 causes the yoke 23 and bearing 25 to move toward the handle thus depressing the upper end of the pawl 19 and releasing the lower portion thereof from the serrations 18, whereupon the said movable member 4 of the driven shaft may be moved by the handle 12.

A similar releasing mechanism is located in the sleeve 7 of the movable member 2 of the driving pulley where the pawl may be actuated by the bearing 25' which is moved (in a direction contrary to that described) by the yoke 23' controlled by the link 26' which is connected with the yoke 23 by the lever 27 and link 28. After the pulleys are set to the proper adjustment they may be locked by the release of the lever 21 whereupon the springs 29 will return the parts to their locked positions once more. The belt 16 may be made triangular in form in cross section so as to provide positive means for engaging the pulleys, and comprises a plurality of blocks and sustaining means, as a band 16'.

From the above description it will readily be seen that the pulley on shaft 5 may have its belt engaging surface increased in diameter as the belt engaging surface of the pulley on shaft 6 is decreased in diameter, and vice versa, and this increase and decrease of the respective bearing surfaces of said pulleys may be as gradual as desired in order that the speed of the driven pulley may be very gradually increased or decreased and be maintained at any required revolutions per minute.

I wish it to be understood that I do not desire to be limited to the particular use or the exact details of construction shown and described, for obvious modifications will occur to persons skilled in the art.

What I claim as my invention is:—

1. In a device of the class described, a pulley comprising a plurality of intermeshing members adapted to be respectively positioned nearer or at a greater distance from each other, means to lock the members by the movement thereof, means for governing the said movement comprising a handle, and means comprising a manually actuated device located adjacent to said handle to release the said members from their adjusted position.

2. In a device of the class described, a pulley comprising a plurality of intermeshing members, one slidable toward and away from the other, means to automatically lock the same by the relative movement thereof, means to move the movable member any desired distance comprising a handle, and means to unlock the last named member from that position and to lock it at will comprising a manually actuated device located adjacent to the handle.

In testimony of the foregoing specification, I do hereby sign the same in the city of New York, county and State of New York, this 23rd day of July, 1919.

MATHEW RITTER.

Witnesses:
 ROB. SCHWARZ,
 J. ODELL FOWLER.